O. P. G. RADSCH.
VEGETABLE PARER.
APPLICATION FILED FEB. 17, 1915.
1,205,784.  Patented Nov. 21, 1916.
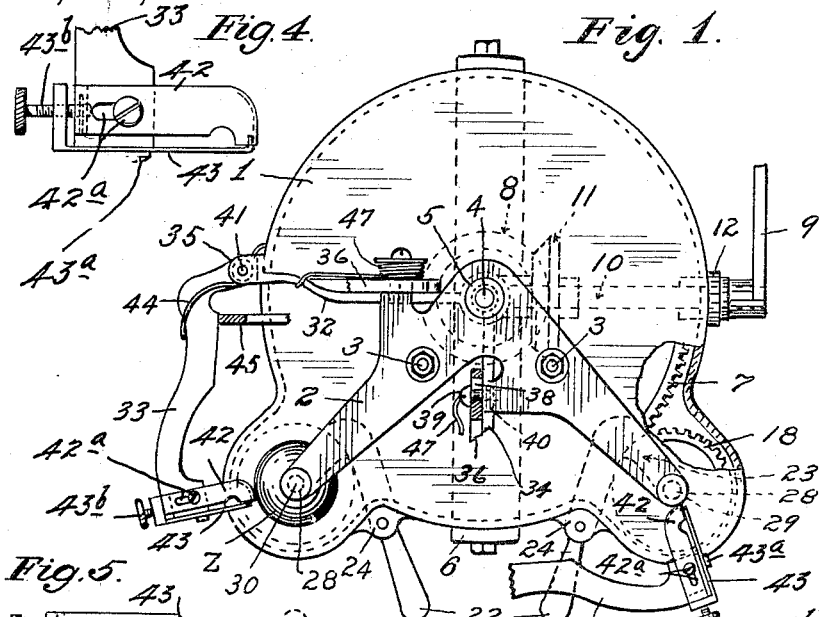
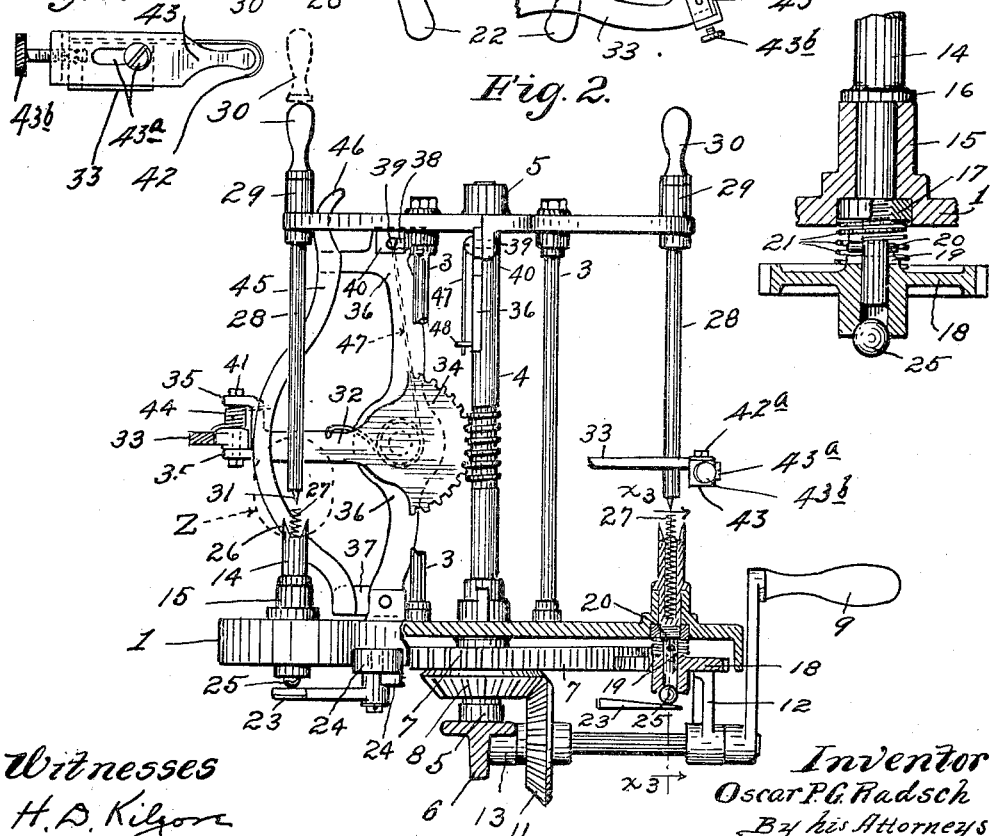
Witnesses
H. D. Kilgore
E. C. Skinkle
Inventor
Oscar P. G. Radsch
By his Attorneys
Williamson & Merchant

UNITED STATES PATENT OFFICE.

OSCAR P. G. RADSCH, OF MILWAUKEE, WISCONSIN.

VEGETABLE-PARER.

1,205,784.

Specification of Letters Patent.

Patented Nov. 21, 1916.

Application filed February 17, 1915. Serial No. 8,898.

*To all whom it may concern:*

Be it known that I, OSCAR P. G. RADSCH, a citizen of the United States, residing at Milwaukee, in the county of Milwaukee and State of Wisconsin, have invented certain new and useful Improvements in Vegetable-Parers; and I do hereby declare the following to be a full, clear, and exact description of the invention, such as will enable others skilled in the art to which it appertains to make and use the same.

My invention has for its object to provide an improved vegetable and fruit parer; and, to this end, it consists of the novel devices and combinations of devices hereinafter described and defined in the claims.

In the accompanying drawings, which illustrate the invention, like characters indicate like parts throughout the several views.

Referring to the drawings: Figure 1 is a plan view of the improved machine, some parts being broken away, and some of the exposed parts being shown in section; Fig. 2 is a side elevation of the same; Fig. 3 is a detail view, on an enlarged scale, taken on the line $X^3 X^3$ of Fig. 2; Fig. 4 is a fragmentary view in plan of one of the paring knives on an enlarged scale; and Fig. 5 is a front elevation of the parts shown in Fig. 4.

The frame of the machine comprises a horizontally extended base 1 and top bracket 2, vertically spaced above said base by upright rods 3, anchored in said base and bracket. A vertically extended worm shaft 4 is loosely journaled in bearings 5, formed in the base 1 and bracket 2, and in a yoke bar 6 secured to and suspended from the base 1. Keyed or otherwise secured to the shaft 4, between the base 1 and yoke bar 6, are a large spur gear 7 and a bevel pinion 8. Rotary motion is imparted to the worm shaft 4 by a hand crank 9 rigidly secured to the outer end of a horizontal counter shaft 10, and a bevel pinion 11, on the inner end thereof, meshes with the bevel pinion 8. This shaft 10 is journaled in a depending bracket 12 on the base 1 and a bearing 13 formed on the yoke bar 6.

The machine, as shown in the drawings, has a capacity of paring two objects at a time, hereinafter referred to as potatoes. As each paring device and holder is an exact duplicate of the other, the description of the one will suffice for the other.

An upright rotary holder or spindle 14 is loosely journaled in a bearing 15, integrally formed with the base 1. A collar 16 and a set nut 17 on the holder 14 engage, respectively, the top and bottom of the bearing 15, and thereby hold said holder against endwise movement, but permit free rotary movement thereof. The lower end of the rotary holder 14 extends below the base 1, and has loosely journaled thereon a pinion 18, which meshes with the spur gear 7. This pinion 18 is free for vertical sliding movement on the rotary holder 14, and is adapted to be locked thereto, for rotation therewith, by coöperating clutch members 19 and 20. The clutch member 19 is in the form of a half clutch on the upper hub section of the pinion 18, and the clutch member 20 is in the form of a pin passed transversely through the rotary holder 14. Normally, these clutch members are held separated by a coiled spring 21, mounted on the rotary holder 14 and re-acting against the set nut 17 and pinion 18. The clutch member 19 is moved into engagement with the clutch member 20 by a hand lever 22, having a beveled cam surface 23, arranged to work under the lower hub section of the pinion 18 and slide the same vertically on the holder 14. The lever 22 is intermediately fulcrumed on a depending bearing 24 on the base 1. An anti-friction roller 25 is interposed between the hub of the pinion 18 and the cam 23.

On the upper end of the rotary holder 14 is a pair of circumferentially spaced barbs 26, adapted to enter and hold a potato Z on said holder. A coiled spring 27 is mounted in an axial seat in the holder 14, and its upper end normally extends above the barbs 26. When a potato is placed on the holder 14, said spring is compressed and tends to lift the potato therefrom. Coöperating with the rotary holder 14 is a centering rod 28, slidably mounted for vertical movement in a bearing 29 on the bracket 2. This centering rod is axially alined with the rotary holder and works thereabove. On the upper end of the rod 28 is a hand piece 30, which also acts as a stop to limit the sliding movement of said rod toward the rotary holder 14. A barb 31, on the lower end of the rod 28, is adapted to enter the potato and hold the same on the rotary holder, as best shown by dotted lines in Fig. 2. The weight of the centering rod 28 is sufficient to prevent the spring 27 from lifting the potato from the holder, but when said rod is raised, said spring will lift the potato from the holder.

The paring knife coöperating with each rotary holder is carried by a primary and secondary arm 32 and 33, respectively. One end of the primary arm 32 terminates in a toothed segment 34, and the other end thereof terminates in a bifurcated head, the prongs of which afford a pair of vertically spaced hinge lugs 35. The primary arm 32 is pivotally mounted, at the axis of the gear 34, to a vertically extended bracket 36, with freedom for swinging movement in a plane that extends parallel to the coöperating rotary holder 14. The lower end of the bracket 36 is pivotally mounted to a bearing lug 37 on the base 1, and the upper end thereof is provided with an elongated slot 38, within which works a screw stud 39, attached to a depending lug 40 on the bracket 2. The bearing lug 37 and the slot and stud connection 38—39 are so arranged as to permit a limited swinging movement of the bracket 36 toward and from the worm shaft 4. In the normal position of the bracket 36, the toothed segment 34 meshes with the worm shaft 4, and the slot 38 is of sufficient length to permit the bracket 36 to be rocked on its pivotal connection a distance sufficient to carry said segment out of mesh with the worm shaft 4.

The inner end of the secondary arm 33 is pivotally attached to a hinge bolt 41 mounted in the hinge lugs 35, for swinging movement in a plane that extends at right angles to the rotary holder 14. On the outer or free end of the secondary arm 33 is mounted a paring knife 42, having a cutting blade that is curved in a vertical plane transversely of said arm. This paring knife 42 is secured to the secondary arm 33 by a set screw and slot connection 42ª for adjustment transversely of said arm in a horizontal plane toward and from the respective holder.

Coöperating with each paring knife 42 is a guard 43, arranged to regulate the depth of the cut made by said knife. This guard is secured to the arm 33 by a set screw and slot connection 43ª and a slow motion screw 43ᵇ is provided for, adjusting said guard toward and from the cutting edge of the knife.

A sear spring 44, mounted on the hinge bolt 41, is arranged to yieldingly move the knife equipped end of the secondary arm 33 toward the axis of the rotary holder 14. By thus mounting the paring knife on primary and secondary arms, said primary arm will move the knife vertically over the surface of the potato, and the secondary arm 33 will yieldingly hold the same against the potato, so that the same will travel over all irregularities in the surfaces thereof.

A vertically extended curved stop bar 45, for the secondary arm 33, is carried by the bracket 36, and is so arranged as to prevent the knife 42 from coming in direct contact with either the holder 14 or the rod 28. At the limit of the upper and lower positions of the knife 42, the stop bar 45 allows the same to come sufficiently near the holder 14 and the rod 28 to pare the ends of the potato. The upper end of the stop bar 45 terminates in a finger piece 46, provided for moving the bracket 36 outward from the worm shaft 4, in order that the gear 34 may be moved out of mesh therewith.

The lowermost position of the knife 42 is the normal position thereof, and a sear spring 47 is provided for yieldingly holding the primary arm 32 in its normal position. This spring is mounted on the hub of the toothed segment, with its ends anchored, one to the primary arm 32 and the other to the screw stud 39, on the bracket 36. Projecting laterally from the bracket 36 between the auxiliary arm 32 and the screw stud 39, is a pin 48, which engages the spring 47 and places the same under strain, to move the free end of the bracket 36 toward the worm shaft 4, thereby yieldingly holding the toothed segment 34 in mesh with the worm shaft 4.

The feed mechanism for the paring knives 42 is arranged to move the same against the tension of the springs 47. When the paring of a potato is completed, the rotary motion of the holder 14 is stopped by drawing the cam 23 outward from under the engaged pinion 18. The clutch members 19 and 20 are automatically separated, in a manner previously stated. The pared potato is removed from the holder 14, and the paring knife is returned to normal position by drawing the bracket 36 outward, by the finger piece, a distance sufficient to release the toothed segment 34 from the worm shaft 4. While the toothed segment 34 is held out of mesh, the spring 47 will return the paring knife 42 to its normal position. Upon releasing the bracket 36, the spring 47 will return said bracket to its normal position, with the toothed segment in mesh with the worm shaft 4, and with the paring knife in position to pare another potato.

As previously stated, the machine shown in the drawing has a capacity of paring two potatoes at a time, but it is, of course, understood that the same may be constructed to pare one or a plurality of potatoes. From the foregoing description, it is evident that, when the paring of one potato is completed, the same may be removed from the machine, and another put in its place, without stopping or interfering in any way with the paring of other potatoes in the machine.

What I claim is:—

1. The combination with a rotary holder, and a coöperating paring knife-equipped arm, of a feed device for said arm, including a gear, a pinion meshing with said gear and axially alined with said rotary holder, a spring-separated clutch for connecting and disconnecting said rotary holder with said pinion, at will, and a clutch-actuated lever having a beveled cam surface engageable with said pinion.

2. The combination with a plurality of rotary holders, and coöperating paring knife-equipped arms, of a common feed device for said arms, including a gear, a pinion loosely journaled on each of said holders, and meshing with said gear, spring-separated clutches, for connecting and disconnecting said pinions with said rotary holders, at will, and clutch-actuated levers having beveled cam surfaces operative on said pinions.

3. The combination with a plurality of rotary holders, and coöperating paring knife-equipped arms, of a common feed device for said arms, including a gear, a pinion loosely journaled on each of said holders, and meshing with said gear, said pinions having half clutches, clutch pins on said rotary holders with which said half clutches coöperate, to lock said pinions to said rotary holders, springs tending to separate said members, and clutch-actuating levers having cam surfaces operative on said pinions.

4. In a paring machine, the combination with a plurality of rotary holders, and coöperating pivotally mounted paring knife-equipped arms, of common means for actuating said holders and arms, means for independently throwing said rotary holders into and out of action, and means for independently returning said arms to their normal positions.

5. In a paring machine, the combination with a plurality of rotary holders, and coöperating pivotally mounted paring knife-equipped arms, of means for actuating said holders, common means for actuating said arms, and means for independently returning said arms to normal positions.

In testimony whereof I affix my signature in presence of two witnesses.

OSCAR P. G. RADSCH.

Witnesses:
  M. C. SCHIFF,
  L. KANTROWITZ.